United States Patent [19]

Sutter et al.

[11] Patent Number: 4,971,533
[45] Date of Patent: Nov. 20, 1990

[54] PISTON OF A ROTARY PISTON ENGINE

[75] Inventors: Franz Sutter; Werner Schubert, both of Lindau, Fed. Rep. of Germany

[73] Assignee: Wankel GmbH, Berlin, Fed. Rep. of Germany

[21] Appl. No.: 297,836

[22] Filed: Jan. 13, 1989

[51] Int. Cl.[5] .......................... F01C 1/02; F01C 19/08
[52] U.S. Cl. ..................................... 418/61.2; 418/110
[58] Field of Search ...................... 418/61.2, 110, 140, 418/144

[56] References Cited

U.S. PATENT DOCUMENTS

| 3,899,272 | 8/1975 | Pratt | 418/61.2 |
| 3,995,976 | 12/1976 | Ishizuka | 418/110 |

FOREIGN PATENT DOCUMENTS

| 0098686 | 7/1980 | Japan | 418/110 |
| 1366113 | 9/1974 | United Kingdom | 418/61.2 |

Primary Examiner—Michael Koczo
Assistant Examiner—John A. Savio, III
Attorney, Agent, or Firm—Robert W. Becker & Associates

[57] ABSTRACT

A piston of a rotary piston engine of trochoidal type of construction, which is radially divided and the parts of which are connected shiftable axially against each other via axial guide bolts and among each other engaging against an elastomeric or resiliently deformable sealing ring, whereby the axial seals of the piston in the sidewalls thereof are structurally fixed or stationary sealing strips. The radial edges of these sealing strips coincide or cover themselves with the contours of the piston flanks or sides and they have cuts, notches or depressions in the piston corners for the radial seals of the piston which are in alignment with the grooves thereof.

7 Claims, 4 Drawing Sheets

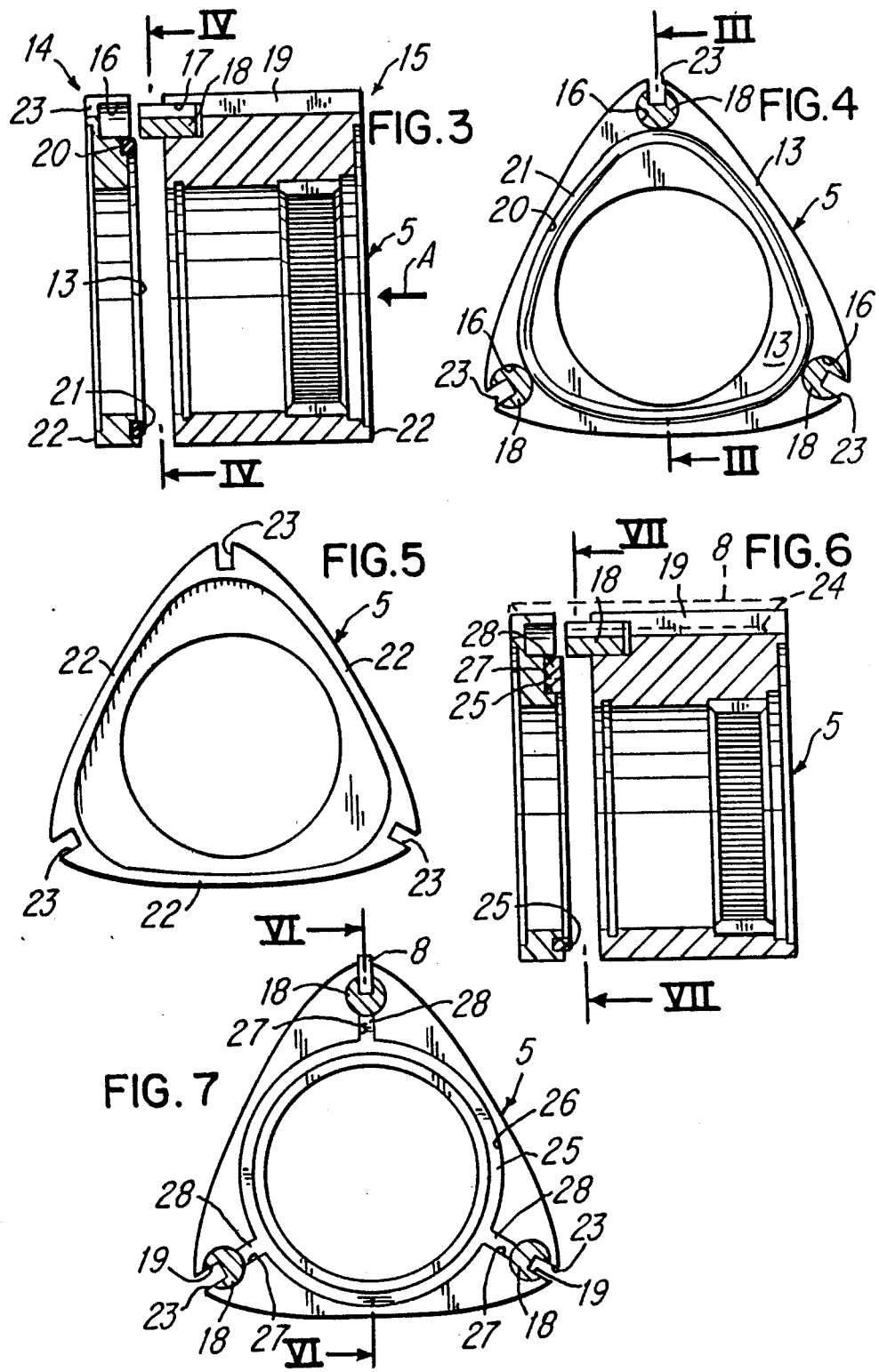

PISTON OF A ROTARY PISTON ENGINE

BACKGROUND OF THE INVENTION

1. Field of the Invention

The present invention relates to a piston of a rotary piston engine with a housing defined or limited by two sidewalls and a n-arcuate trochoidal-shaped casing or mantle runway; the sidewalls have an eccentric shaft passing therethrough and an eccentric of a n+1-corner piston is located upon the eccentric shaft and sealing strips of the piston in a planetary movement are subject to continuous engagement at corners of the piston along the casing or mantle runway; and the piston rotates with axially fixed sealing strips along the engaged or adjoining sidewalls of the housing, such sealing strips being provided along the sidewalls thereof.

2. Description of the Prior Art

A rotary piston engine with such a sealing system is described in German Offenlegungsschrift No. 27 37 758-Eiermann dated Mar. 1, 1979 belonging to the assignee of the present invention, with which a piston sidewall is sealed-off relative to an adjoining housing sidewall via webs forming stationary or fixed narrow sealing strips, which follow the piston contour or shape with a small spacing and in which the radial sealing strips engage in slits or slots that are aligned with grooves of these sealing strips. The other piston side is sealed-off relative to the housing sidewall located with respect thereto in a conventional manner via axial sealing strips and sealing bolts resiliently located in grooves. The groove springs of these sealing strips press the piston with deficient operating pressure subject to engagement along the movable sealing parts with the stationary webs against the sidewall of the housing located relative thereto. In operation, the piston is pressed against the piston sidewall via effectiveness or influence of the pressure gases upon a surface with webs located externally of the sealing limit of axially movable sealing parts. Such an arrangement to be sure results in a saving of half of the axial Sealing elements although the production and assembly of the remaining sealing elements however still require a considerable cost and complexity.

SUMMARY OF THE INVENTION

An object of the present invention is to provide a sealing system with which all movable axial sealing parts can be eliminated while maintaining a complete sealing-off relationship.

The solution of this object results with the initially mentioned engines with which features are provided in accordance with the present inventive disclosure.

The present inventive arrangement permits a complete sealing-off with engines or machines with every measurement or dimensioning so long as the sidewalls are not subjected to any heat loading producing or generating any greater distortions, but also with higher heat loading, as for example with motors or engines, with smaller radial housing measurements or dimensions. The inventive sealing system is superior to conventional sealing systems operating with movable axial sealing parts to the extent that the leakage paths are avoided leading via the groove base of the radial sealing strips and the groove gap of the sealing bolt on the under pressure side. The production and assembly costs are considerably reduced by the invention and additionally there results a greater operating certainty and safeness, since the radial sealing strips under critical circumstances are eliminated.

An advantage of the present invention results thereby that as a consequence of an arrangement of stationary, fixed or solid axial sealing parts, there is possible to embody control openings in the sidewalls of the housing more freely and larger. Attention need no longer be directed to the danger of dropping or falling-in of such sealing parts into the control openings or the striking of the edges thereof against the edges of the control openings.

BRIEF DESCRIPTION OF THE DRAWINGS

This object, and other objects and advantages of the present invention, will appear more clearly from the following specification in conjunction with the accompanying drawings, in which:

FIG. 3 is an axial sectional view taken along III—III in FIG. 4 through a piston in accordance with the present invention;

FIG. 4 is a radial sectional view taken along IV—IV in FIG. 3 through the same piston;

FIG. 5 is an axial plan view upon a side wall of the same piston in the direction of the arrow A;

FIG. 6 is an axial sectional view along VI—VI in FIG. 7 through a further embodiment of a piston having features in accordance with the present invention; and FIG. 7 is a radial sectional view taken along VII—VII in FIG. 6 through the piston according to FIG. 6.

DETAILED DESCRIPTION

Figure 1:
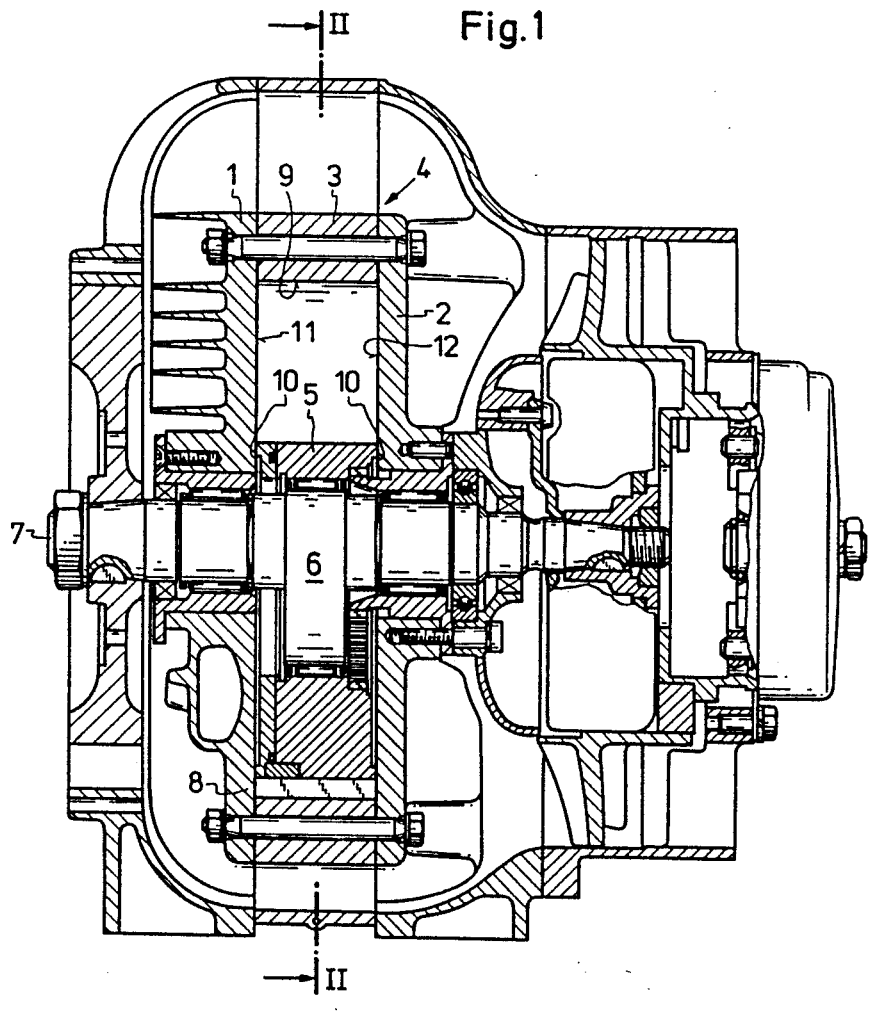
FIG. 1 is an axial sectional view taken along I—I in FIG. 2 through a 2:3 transmission or gear-ratio rotary piston engine of trochoidal type of construction with a piston having features in accordance with the present invention.
Figure 2:
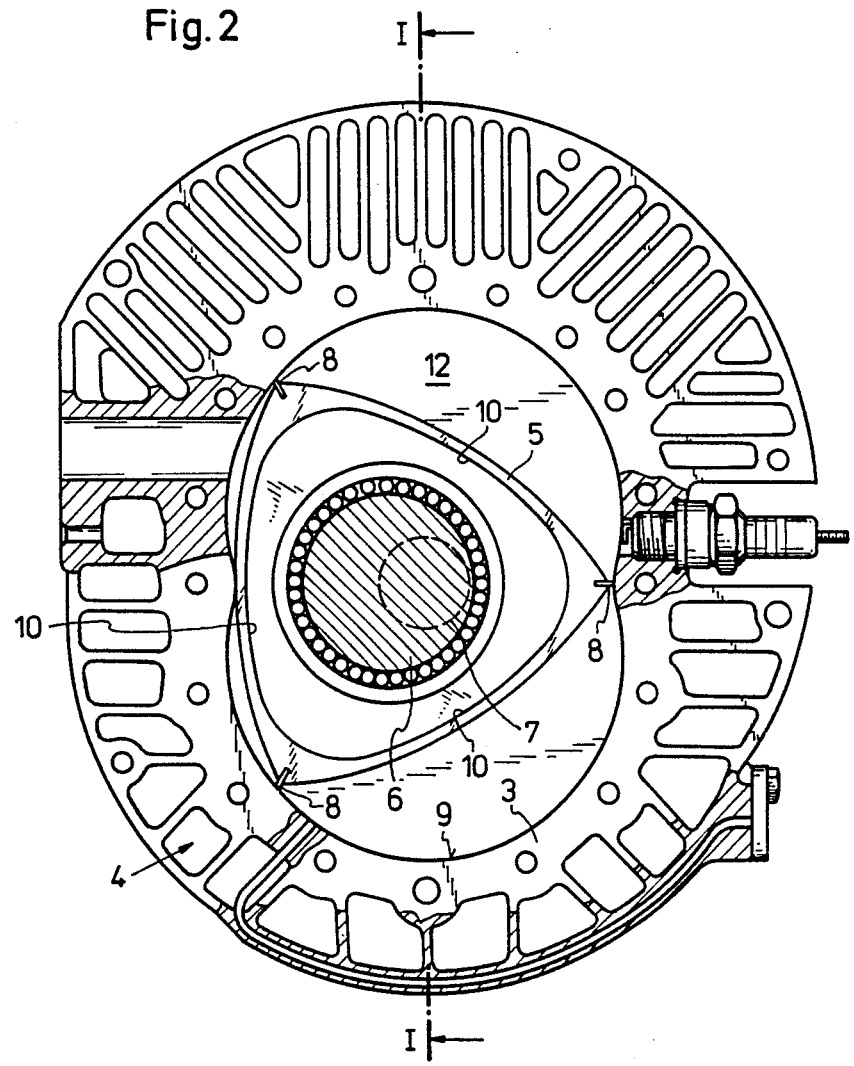
FIG. 2 is a radial sectional view taken along II—II in FIG. 1 of the same machine.

The rotary piston engine illustrated in FIGS. 1 and 2 has a housing 4 formed of side parts 1 and 2 and a casing or mantle part 3. The piston 5 rotates or runs upon an eccentric 6 of an eccentric shaft 7, which is journalled or mounted in the side parts 1 and 2. The piston with the radial sealing strips 8 slides or glides along the casing or mantle raceway 9 and moves with the axial sealing strips 10 in continuous engagement along the sidewalls 11 and 12 of the side parts 1 and 2. FIGS. 3 and 4 show the piston 5 which is divided in an axial separating plane 13 into a smaller part 14 and a larger part 15. In both the smaller part 14 and the larger part 15 in the region of the piston corners and installed from the inner sides of the parts 14 and 15 formed by the separating plane 13, there are toward the outer sides of these parts non-continuous bores 16 and 17 provided respectively in alignment among each other, in which guide bolts 18 are arranged. These guide bolts 18 connect both parts 14 and 15 among each other so that the parts 14 and 15 are axially shiftable against each other, not however being rotatable among each other or twistable among each other. The grooves 19 for the sealing strips 8 are cut in the same manner into the bores 16 and 17 and the guide bolts 18; this is the situation with otherwise conventional arrangements which have sealing bolts connecting axial and radial sealing parts.

A groove 20 is arranged extending or going all around within the guide bolt 18 in the inner side of the part 14 of the piston 5, into which groove a sealing ring 21 of elastomeric material is inserted, which upon installation engages under pressure against the inner side of the piston part 15. Consequently, on the one hand, an inner space or chamber of the piston 8 is sealed-off relative to the working or operating chambers of the engine or machine and on the other hand, a gap chamber engaged by working or operating pressure is formed between the two parts 14 and 15 externally of the sealing ring 21. The two parts 14 and 15 of the piston 5 are driven apart or away from each other via this pressure and are pressed against the sidewalls 11 and 12 of the housing 4. During standstill of the engine or machine, this pressing occurs via the elastomeric sealing ring 21 which is under pressure as installed.

Narrow webs 22 are arranged forming the sealing strips 10 on the outer sidewalls of the parts 14 and 15 of the piston 5 and extending toward these sidewalls 11 and 12 and directed thereto; these webs extend as far as to the radial edges of the parts 14 and 15. Cuts, notched depressions or indentations 23 are provided in the piston corners in the webs 22 and these notches 23 are aligned accurately and exactly with the grooves 19 for the radial sealing strips 8. The radial sealing strips extend expediently and suitably with conventional sealing triangles 24 as far as to the housing sidewalls 11 and 12 in these notches 23 (dash-line designation in FIG. 6).

The sealing ring 21 illustrated in FIG. 4 follows the triangular contour of the piston 5 in the form or shape of a three-axis ellipse and the sealing ring 21 engages tangentially against the guide bolt 18. In order to enlarge the engagement surfaces of the parts 14 and 15 of the piston 5, as shown in FIGS. 6 and 7, a circular or round sealing ring 25 is provided in a circular or round groove 26 and connection arms 28 on the sealing ring 25 can be arranged in connection grooves 27 between the sealing ring 25 and the guide bolt 18; these connection arms engage sealingly against the guide bolt 18 with a corresponding rounded-out portion under stress or tension.

The present invention is, of course, in no way restricted to the specific disclosure of the specification and drawings, but also encompasses any modifications within the scope of the appended claims.

What we claim is:

1. A piston of a rotary piston engine having working chambers formed with a housing delimited by two sidewalls and a mantle raceway casing of trochoidal shape in n-arcuate trochoidal form, said sidewalls having en eccentric shaft passing therethrough and including an eccentric of the eccentric shaft having an n+1-corner piston in a planetary shaped movement subject to continuous engagement of sealing strips movable radially as arranged in the corners thereof against the mantle raceway casing and being provided with axially stationary sealing strips along one of the sidewalls thereof at the adjoining sidewall of the housing, the improvement in combination therewith comprising:
   that the piston is divided axially into two piston parts having gap chamber means therebetween and including means with which the working chambers are sealed-off completely among each other for compressor operation free of any leakage paths relative thereto being avoided with all movable axial sealing parts being eliminated while maintaining a complete sealing-off relationship and that axial bores are provided in these two parts of the piston respectively oriented and aligned among each other, into which the two parts of the piston are arranged axially shiftable connected via guide bolts, and
   furthermore said means with which the working chambers are sealed-off completely including an elastomerically and resiliently deformable sealing ring that is arranged along a side of one of the parts of the piston at a location disposed radially inwardly of the guide bolts and engaging against surface of the respectively other remaining part of the piston, and
   furthermore said means with which the working chambers are sealed-off completely including that finally stationary webs are provided which form the axial sealing strips along the sides of the parts of the piston located opposite the sidewalls of the housing, which stationary webs have notched depressions at the corners of the piston and oriented in alignment with the radial sealing strips.

2. A piston of a rotary piston engine with a housing delimited by two sidewalls and a mantle raceway casing of trochoidal shape in n-arcuate trochoidal form, said sidewalls having an eccentric shaft passing therethrough and including an eccentric of the eccentric shaft having an n+1-corner piston in a planetary shaped movement subject to continuous engagement of sealing strips movable radially as arranged in the corners thereof against the mantle raceway casing and being provided with axially stationary sealing strips along one of the sidewalls thereof at the adjoining sidewall of the housing, the improvement comprising:
   that the piston is divided axially into two parts and that axial bores are provided in these two parts of the piston respectively oriented and aligned among each other, into which the two parts of the piston are arranged axially shiftable connected via guide bolts, and
   furthermore an elastomerically and resiliently deformable sealing ring is arranged along a side of one of the parts of the piston and engaging against a surface of the respectively other remaining part of the piston, and
   that finally stationary webs are provided which form the axial sealing strips along the sides of the parts of the piston located opposite the sidewalls of the housing, which webs have notched depressions at the corners of the piston and oriented in alignment with the radial sealing strips, and
   means are provided for closing the bores toward the outer sides of the parts of the piston.

3. A piston according to claim 2, wherein respectively one guide bolt is provided in a region of each of the corners of the piston.

4. A piston according to claim 2, in which the notched depressions for the radial sealing strips cut into the guide bolt.

5. A piston according to claim 2, wherein said sealing ring and the groove receiving said sealing ring follow with a spacing radially within a contour of the piston as seen in the axial direction.

6. A piston according to claim 2, wherein the sealing ring and the groove depression receiving the sealing ring are circular or round and including arms in connection grooves located extending radially outwardly, which arms under tension engage against the guide bolt.

7. A piston according to claim 6, in which said sealing ring consists of elastomeric resiliently deformable material and after installation of the piston being deformed resiliently under pressure in the axial direction.

* * * * *